July 30, 1929.  F. W. MANNING  1,722,809
MAGAZINE FILTER AND STILL
Filed Dec. 12, 1925   2 Sheets-Sheet 1

INVENTOR.
FRED W. MANNING
BY
ATTORNEYS.

July 30, 1929.  F. W. MANNING  1,722,809
MAGAZINE FILTER AND STILL
Filed Dec. 12, 1925   2 Sheets-Sheet 2
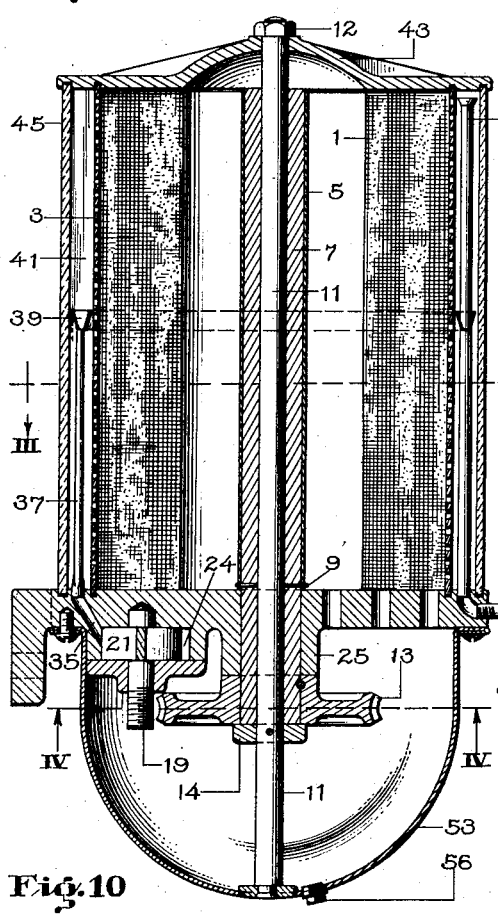
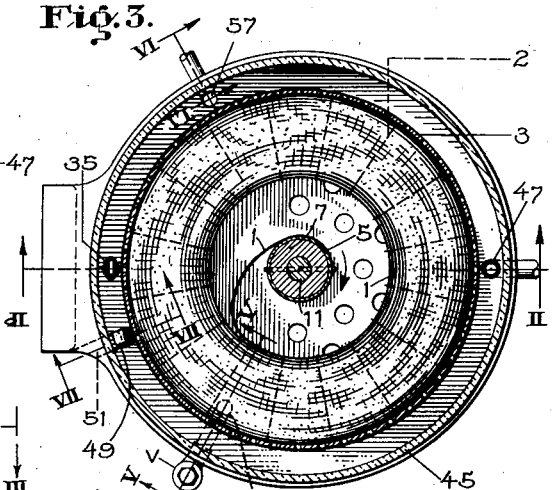
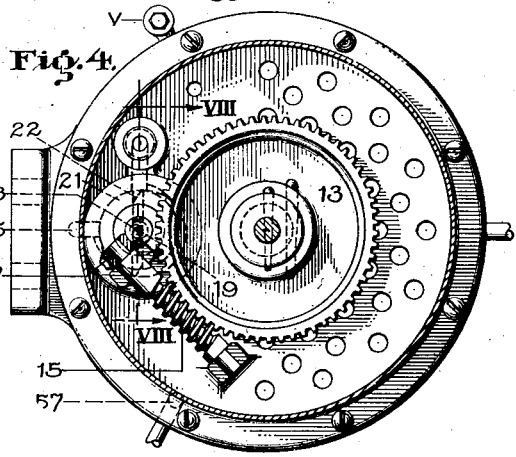
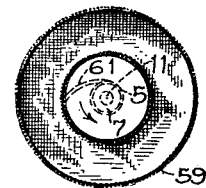
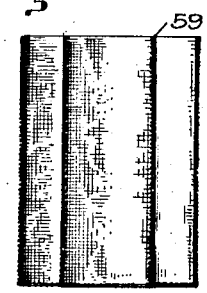
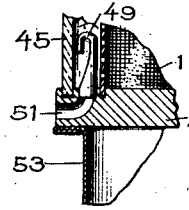
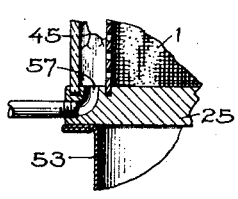
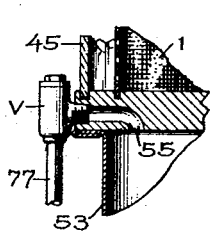
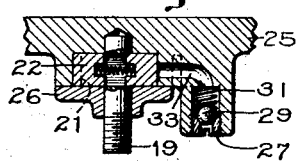
INVENTOR.
FRED W. MANNING
BY
ATTORNEYS.

Patented July 30, 1929.

1,722,809

UNITED STATES PATENT OFFICE.

FRED W. MANNING, OF BERKELEY, CALIFORNIA, ASSIGNOR TO STEWART-WARNER CORPORATION, OF CHICAGO, ILLINOIS, A CORPORATION OF VIRGINIA.

MAGAZINE FILTER AND STILL.

Application filed December 12, 1925. Serial No. 75,003.

This invention relates to the treatment of liquids for effecting their purification or other desired improvements in their characteristics, but more particularly it relates to a method and means for the continuous purification of motor oils of internal combustion engines during operation, by distillation, clarification, decolorization, or other treatment.

Lubricating oils of motor vehicles very quickly become contaminated with solid particles such as road dust, metal and carbon particles, and the abrasive action of these impurities is often accentuated by dilution of the lubricating oil caused by the addition of fuel oil entrained with the explosive mixture or which condenses out of the mixture when the engine is cold in starting, or by water resulting chiefly from the condensation of the burned gases especially when the engine is cold. The liquid fuel and water leak past the pistons and may carry down into the crank case more or less of the solid impurities, other solid impurities enter the lubricating system through the breather and from other sources.

The constant wear on the engine parts due to the contamination of crank case oil of motor vehicles has been relieved to some extent by the use of various types of filters. However, these have not been found to be very satisfactory, as they have been of the intermittent pressure type and their filter fabrics, being much limited as to filter area, quickly become clogged with impurities or become impervious due to being swollen by water particles, resulting in constantly decreasing filtering rates and increasing filtering pressures, and moreover the clarity obtained after a filter has been in use for any period of time cannot be obtained earlier in that period. The ultimate result is the replacement of either the filter fabric or the complete filter which, because of the attendant inconvenience or expense, is often neglected.

In copending applications filed October 1, 1925, Serial Number 59,787; October 22, 1925, Serial Number 64,247; October 24, 1925, Serial Number 64,495, Patent Number 1,669,718, issued May 15, 1928; and November 19, 1925, Serial Number 70,111, I have described how a magazine type of filter may be used to give a standard clarity and a constant filtering rate at a constant filtering pressure, and may contain a reserve supply of filtering fabric which may be brought into use only as required by means of the liquid pressure alone. I have also described how the viscosity of the lubricating oil may be kept constant by suitably regulating the temperature of the oil, filtering out its solid impurities and eliminating the fuel and water dilution by distillation. The present application may be considered a continuation in part of the last mentioned application particularly Figures 5 and 6 of that application, which show a magazine filter in which the reserve supply of filter fabric or belting is wound upon the outside of the filter drum, and which as it becomes exhausted, is wound upon an exterior storage spool.

It is an object of this invention to provide a much more compact and economical construction of magazine filter in which the reserve supply of filter fabric in the form of a roll of belting may be used on the inside of the filter drum, and which, as it becomes exhausted, may be wound upon an interior storage spool.

It is also an object of this invention to provide a rectifying apparatus enclosing a magazine filter which will enable the operator of a motor car equipped with such an apparatus to determine at a glance its efficiency as to clarity, filtering rate, constant removal of the exhausted filtering fabric, and also when the filtering fabric must be replenished.

It is a further object of this invention to provide a rectifying apparatus enclosing a magazine filter which will enable the operator of a motor car equipped with such an apparatus to determine at a glance its efficiency as to clarity, filtering rate, constant removal of the exhausted filtering fabric, and also when the filtering fabric must be replenished.

It is a further object of this invention to provide a magazine filter which will enable the operator to discard the exhausted filter material and replenish the filter with a fresh supply in two minutes time and at a minimum expense.

With the above and other objects in view, the invention will be understood by reference to the following description, taken in conjunction with the accompanying drawings which illustrate a preferred form of apparatus for carrying out my invention.

In the drawings:

Figure 2 is a sectional elevation of the filter and still taken on line II—II of Figure 3.

Figure 3 is a sectional plan of the filter and still taken on line III—III of Figure 2.

Figure 4 is a sectional plan of the filter and still taken on line IV—IV of Figure 2.

Figure 5 is a section on line V—V of Figure 3, showing the feed inlet.

Figure 6 is a section on line VI—VI of Figure 3, showing the filtrate outlet.

Figure 7 is a section on line VII—VII of Figure 3, showing the breather.

Figure 8 is a section on line VIII—VIII of Figure 4, showing the relief valve.

Figure 9 is an enlarged section of the filter drum shown in Figure 3.

Figure 10 is a plan of a screen basket which may be used to hold treating solids when it is desirable to use such instead of a filtering belt.

Figure 11 is an elevation of the screen basket shown in Figure 9.

Figure 1:
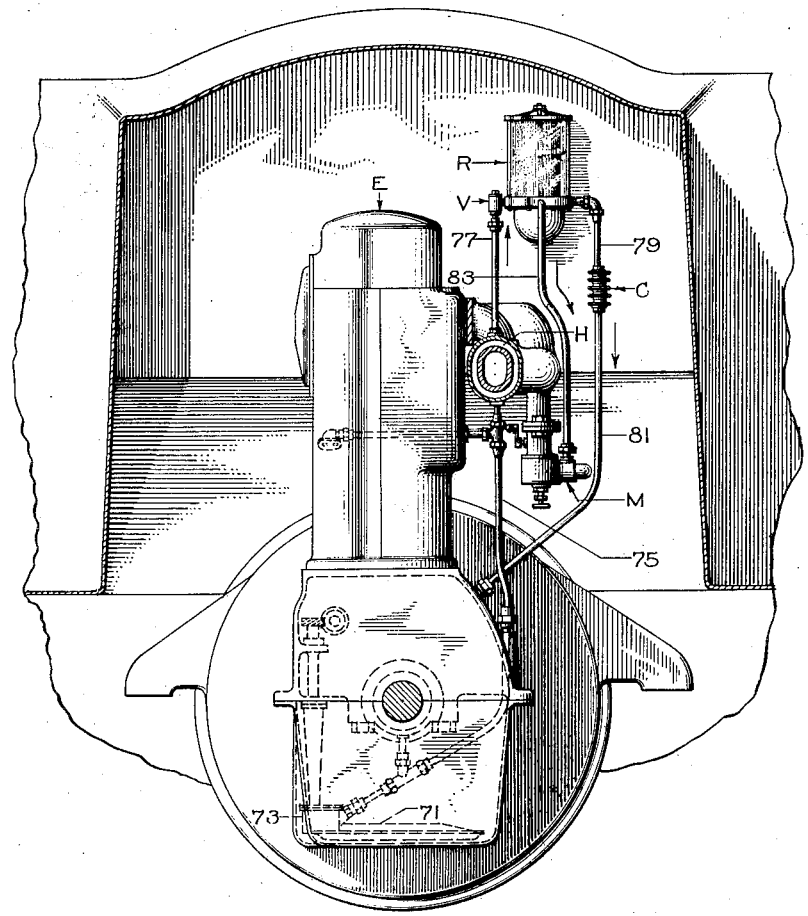
Figure 1 is a front elevation of the dash of a motor vehicle showing the relative position of the filter and still with engine.

Referring more specifically to the drawing by reference characters:

Figure 1 illustrates one arrangement in a standard make of motor car of the refining apparatus R, heater H, cooler C, carbureter or mixing device M with the engine E and their piping connections.

Figs. 2 to 9 show the details of the refining apparatus R. The filter fabric or belt 1 held in position by threads or pins 2, is stored on the inside of a perforated filter drum 3 whose inner wall with drainage screen 4 forms a supporting surface for the fabric and whose outer finely grooved wall forms an evaporating surface for the filtered oil. The loose end of the filter belt is attached to a brass storage spool 5 slipped on over driving sleeve 7 and engaging with the pin 9 of the driving sleeve. The driving sleeve rotates on bolt 11 and is driven through worm gear 13 to which it is fastened, worm 15, worm gear 17 and worm 19 attached to the liquid impeller 21 and the driving sleeve and the worm gear 13 are supported by collar 14 pinned to the bolt 11. The impeller has a plurality of vanes 22 tensioned by springs 23 which engage with the walls of the liquid motor chamber 24 enclosed by perforated floor plate 25 and cover plate 26. Any slight rise in pressure causes the oil to enter adjusting nut 27, lift the relief valve 29 tensioned by spring 31, and passed through the opening 33 into the liquid motor chamber where its further passage against the motor vanes causes the impeller to rotate. On leaving the liquid motor chamber the oil passes through opening 35, upright 37 and overflows trough 39 into the still 41 enclosed by the perforated floor plate, perforated filter drum, cover plate 43 and outer cylinder 45. The outer cylinder is made preferably by pyrox glass or other suitable transparent material reinforced or protected by wire screen, perforated plate or bars. Ventilating pipe 47 carries off the vapors, and the ventilating gases enter the still through the breather 49, and passage 51. The oil to be purified enters the sump pan 53 through passage 55 and against the loaded check valve V and leaves the still by passage 57.

Figs. 10 and 11 show a screen basket 59 to hold filter material when it is desirable that such should take the place of a filter belt. Scraper 61 shown by dotted lines would then be attached to the spool 5 which slips over and is pinned to rotating sleeve 7.

The operation of the apparatus thus constructed has been in part indicated in connection with the foregoing description. As shown in Figure 1, oil from the crank case reservoir enters the screen inlet 71 of the pump 73 driven by the engine E, a portion of it going to parts of the engine to be lubricated and a portion of it passing up pipe 75 to heater H which may surround or pass through the exhaust manifold. The oil after being suitably heated for filtration and distillation purposes passes through pipe 77, spring loaded check valve V, passage 55, and into the sump pan 53, the check valve V being used to maintain any suitable pressure in the lubricating system. The oil may also be heated by passing a portion of the exhaust gases or air heated by the exhaust gases through a coil in the sump pan of the filter and may then be passed into the still and used as ventilating gases, and their passage may be thermostatically controlled, thereby regulating the temperature of the oil in both the filter and the still.

The oil after entering sump pan 53 passes through the perforated floor plate 25 into the filter chamber, through the filter fabric windings 1, the perforated filter drum 3 into the still 41, where it runs down the finely grooved outer surface of the heated drum, and out passage 57. It then either returns by gravity through pipe 79, cooler C, and pipe 81 to the crank case, or is pumped from the still through the cooler to parts to be lubricated. During the passage of the filtered oil down the finely grooved outer surface of the heated filter drum, it is subject to a lively current of air or other gas passing upwardly from the breather 49 under a slight vacuum from the engine, which carries off the volatile portion of the filtered oil. The ventilating gas with vapors leave the upper portion of the still through pipe 47 and after passing through pipe 83 enter the carbureter or mixing device M.

As the filter fabric becomes clogged, the pressure will rise to a predetermined point upon which a portion of the oil in the upper part of the sump will raise the relief valve 29, pass through the liquid motor chamber 24 and into the still 41, and through rotation of impeller 21, worm 19, worm gear 17, worm 15, worm gear 13, and rotating sleeve 7, cause the storage spool 5 to wind up a portion of the exhausted filtering fabric and uncover a sufficient amount of fresh filtering surface to bring the pressure back to normal.

The by-passed oil upon entering the still through upright pipe 37, overflows in thin sheets both sides of the annular trough 39 and in falling is acted upon in the same way as the filtered oil—it encounters a rising current of air or other gas passing upwardly under a slight vacuum from the breather, which carries off the volatile contaminations back to the engine intake, and the oil returns to the crank case, or is pumped to parts to be lubricated.

The vacuum existing in the still due to the connections 47 and 83 to the carbureter intake serves to carry off the volatile contaminations and it aids filtration, but it is not sufficient to prevent the purified oil from returning to the crank case by gravity. Connections from the still to the intake manifold would give a higher vacuum, but in such a case the oil would have to be removed from the still by pump pressure or by a float arrangement.

Threads or pins 2 will prevent the windings of filtered fabric from collapsing when no pressure exists in the filter chamber as when the engine is not running. They will also place a slight tension on the winding up of the exhausted filtering fabric as well as prevent fresh filtering surface becoming exposed too readily, although the filtering action of the oil will usually be sufficient to hold the first windings firmly in place. The placing of these threads in position may be accomplished by simply sewing the annular roll of filter fabric back and forth and cutting the threads at their inside turn. If pins are used, they should be of soft material and capable of bending as the exhausted fabric is being removed and should be attached to the last winding.

If it is desirable to treat the oil with a decolorizing agent as fuller's earth, bone char etc., or a clarifying agent as asbestos, cotton fibre, kieselguhr etc., or other treating agent, the agent may be impregnated in the filtering fabric, or enclosed within two folds thereof, or the agent may be placed in the screen or filter basket shown in Figures 10 and 11 and the basket substituted for the annular roll of filter belt, in which case a scraper 61 attached to the brass spool 5 and pinned to rotating sleeve 7, will remove the filter cake solids in the usual manner whenever there is a predetermined rise in pressure. Or, if desirable, an annular ring of asbestos, cotton fiber, paper pulp, felt, or other suitable material which may be impregnated with or contain another treating agent, may be substituted for the filter basket, and scraper 61 used to remove the filtered solids therefrom, which upon removal will sink through the perforations in floor plate 25 into the sump pan from which they may be removed periodically by removing clean out plug 56.

If water should exist in the oil in an emulsified state, the emulsion may be broken up to a large extent by heating the oil and the separated water will then settle in the sump pan above any settled out sludge but below the filter chamber. The greater portion will then always be passed out through the relief valve, whose entrance is just below the filter belt windings, and into the still without wetting the filtering fabric.

When the filter belt is exhausted and completely removed from the inside of the filter drum, the oil will pour through the lower part of the filter drum into the still and no oil will be either filtered or by-passed. It is then only necessary to remove the nut 12, raise the cover 43, lift out storage spool 5 upon which the exhaused fabric is wound, and slip a new annular roll of filter belt with attached spool into place. If a filter basket containing a treating agent, or an annular roll of filtering material, not in belt form, is used instead of an annular roll of filter belt, the exhaustion of such will be indicated by an increasing amount of oil by-passed and a decreasing amount of oil filtered. The treating agent can be conveniently replenished by simply lifting out, dumping, refilling, and replacing the basket. A filter roll, not in belt form, would simply be discarded and replaced by a new one. In either case the scraper 61 attached to spool 5 would remain permanently in position.

It is advisable that the oil should pass from the inside of the roll of filter fabric windings outwardly instead of the reverse. Finer impurities will in time permeate the roll and therefore at the start the fresh and consequently faster filtering surface will make up for the smaller filtering area despite the greater filtering depth. And the smaller filtering area with the fresher filtering surface will give approximately the same total filtering rate per unit of time without advancement of fresh filtering surface, as the larger filtering area and lesser filtering depth at a later period. To reverse the filtering direction as shown in Figs. 5 and 6 of the previous application mentioned above, would make necessary the by-passing of a constantly increasing amount of oil and the total extent of clarification per roll of filter fabric would not be as great.

The filter fabric may be of any suitable porous material that will give a free flow through a depth of several inches of windings for any suitable pressure as for instance, pressures ranging from two to twenty pounds. As a rule, two or three pounds pressure will be sufficient to cause a free flow of oil through two or three inches of the filter fabric windings and if higher pressures are used it will be necessary mostly because of the resistance to filtration offered by the filter cake solids on the first or inner winding. This winding with the aid of several underlying thicknesses of fabric will always retain the greater portion of solid impurities and after a thin filter cake has once been built in or upon the mesh of the first winding, the latter will retain all further filtered solids until the clogging action has progressed to a predetermined extent or a predetermined thickness of filter cake has been built up. The exhausted fabric with collected solids will then be removed automatically from the underlying comparatively fresh fabric, and wound upon the storage spool.

It will thus be seen that the reserve supply of filter material in the present invention must be of suitable nature to permit a free flow of liquid through its entire depth, and the filter belt should therefore be regarded as simply a retaining wall for the solids, the first or inner winding of the belt always retaining the greater portion of the filtered solids. The clarity of the filtrate, the rate of filtration, and the pressure maintained in the filter chamber, will therefore depend upon the predetermined extent of the clogging action of the solids in or on the filtering fabric and will always be substantially constant for that predetermined extent.

It will also be seen that the present invention, by enclosing the contaminated oil within a reserve supply of filter material, provides a method for keeping the oil hot until filtered, and the filtering of the heated oil outwardly through a perforated filter drum surrounded by an exterior cylinder keeps the drum hot, thus providing ideal filtering conditions for removing the solid contaminations from the oil. Also, it will be evident that with the exterior cylinder acting as a flue for the upward movement of the ventilating gases and vapors passing under suction over and in close contact with the heated and finely grooved surface of the filter drum, ideal conditions are provided for volatilizing and removing the liquid contaminations of the oil.

It will also be obvious that the present invention provides an apparatus for the purification of the crank case oil of motor cars which will enable the motorist to determine at a glance the clarity of the oil being filtered, the filtering rate of the oil, if the operating means for supplying fresh filtering surface is working perfectly, when the supply of filtering material should be replenished, and it also enables the motorist to replenish the filtering material at a minimum of time and expense.

Having thus described my invention, what I claim is:

1. In a filter, a filter member comprising a hollow roll of filter fabric, means for forcing the liquid to be filtered into the roll and outwardly therethrough, a spool within the member connected to the inner end of the fabric, and means for rotating the spool in a manner removing a portion of the inner layer of fabric and the filtered-out solids collected thereon when the filtering pressure reaches a predetermined amount.

2. In a filtering apparatus, an annular filtering member, means for passing the fluid to be filtered radially outward through said member, and means within and co-operating with said member for removing an inner surface portion of said filtering member together with the filtered out material accumulated on said surface.

3. In a filter, a filter member comprising an annular roll of layers of filter material, means for passing a fluid to be filtered through the said layers, and means for removing the inner layer thereby exposing fresh filter material to the fluid to be filtered.

4. In a filter, a filter member comprising an annular roll of layers of filter material, means for passing a fluid to be filtered through the said layers, and means for removing the inner layer to form a conveyor for the filtered out solids.

5. In a filter, an annular filter member, means for passing a fluid to be filtered radially outwardly through the member, and means within and cooperating with the member for removing the fluid inlet portion of the member.

6. In a filter, an annular filter member, means for passing a fluid to be filtered radially outwardly through the member, and means within and cooperating with the member for removing the filtered out solids when the said solids have clogged the member a predetermined amount.

7. In a filter, a filter member comprising a roll of filter fabric, a spool connected to the inner end of the roll of fabric, and means for rotating the spool in a manner removing a portion of the fabric and the filtered out solids collected thereon.

8. In a filter, a filter member comprising a roll of filter fabric, a spool connected to the inner end of the roll of fabric, and means for rotating the spool in a manner removing a portion of the fabric and the filtered-out solids collected thereon when the solids have clogged the member a predetermined amount.

FRED W. MANNING.